United States Patent [19]

Lowther

[11] 4,027,169
[45] May 31, 1977

[54] HIGH FREQUENCY POWER SUPPLY

[75] Inventor: Frank Eugene Lowther, Severna Park, Md.

[73] Assignee: Union Carbide Corporation, New York, N.Y.

[22] Filed: Aug. 28, 1975

[21] Appl. No.: 608,762

Related U.S. Application Data

[63] Continuation-in-part of Ser. No. 456,396, March 29, 1974, abandoned, and a continuation-in-part of Ser. No. 509,016, Sept. 25, 1974, abandoned, and a continuation-in-part of Ser. No. 534,568, Dec. 19, 1974, abandoned.

[52] U.S. Cl. .............................. 250/536; 321/45 R
[51] Int. Cl.² ........................................ C01B 13/11
[58] Field of Search .......... 317/2 H, 2 F, 4, 262 A; 307/132 R, 43, 81, 82, 252 L, 305; 204/176; 250/531, 532, 535, 536; 321/4, 45 R

[56] References Cited

UNITED STATES PATENTS

| | | | |
|---|---|---|---|
| 3,328,596 | 6/1967 | Germann et al. | 321/45 R |
| 3,351,779 | 11/1967 | Hehenkamp | 321/45 R |
| 3,368,164 | 2/1968 | Shapiro | 321/45 R |
| 3,496,092 | 2/1970 | Fraser | 321/45 R |
| 3,579,111 | 5/1971 | Johannessen et al. | 307/252 L |
| 3,729,672 | 4/1973 | Rosenthal et al. | 321/45 R |
| 3,760,258 | 9/1973 | Percorini et al. | 321/45 R |
| 3,784,838 | 1/1974 | Lowther | 250/536 |
| 3,800,210 | 3/1974 | Caussin | 321/45 R |
| 3,865,438 | 2/1975 | Boksjo et al. | 321/11 |
| 3,875,035 | 4/1975 | Lowther | 321/4 |

FOREIGN PATENTS OR APPLICATIONS

| | | | |
|---|---|---|---|
| 267,763 | 7/1970 | U.S.S.R. | 307/252 L |

*Primary Examiner*—William H. Beha, Jr.
*Attorney, Agent, or Firm*—Eugene Lieberstein

[57] ABSTRACT

A corona generator having a high voltage, high frequency power supply wherein a plurality of transient commutated silicon controlled rectifiers (SCR's) are driven in series. The use of series connected unmatched SCR's without associated voltage equalization means increases the duration of the reverse commutation pulse and hence, permits higher switching frequency.

7 Claims, 12 Drawing Figures

FIG. I

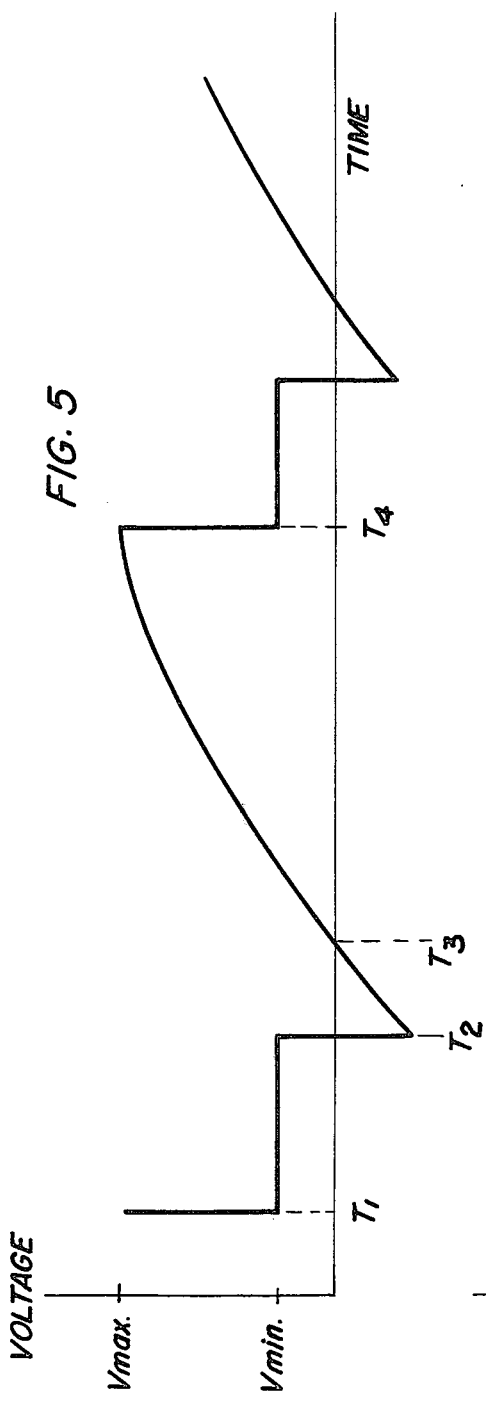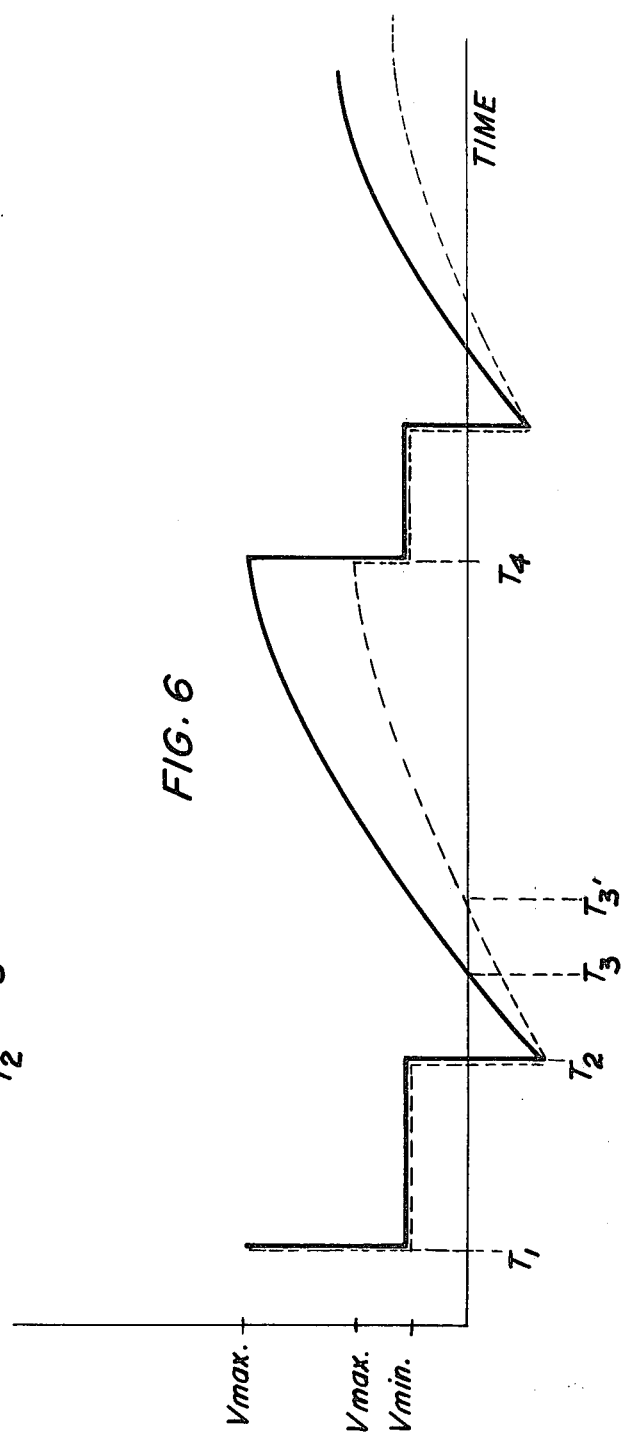

HIGH FREQUENCY POWER SUPPLY

This application is a continuation-in part of my applications Ser. Nos. 456,396, filed Mar. 29, 1974, now abandoned; 509,016 filed Sept. 25, 1974 now abandoned; and Ser. No. 534,568 filed Dec. 19, 1974 now abandoned.

The present invention relates to corona generation devices, and more specifically to an improved power supply circuit and associated corona generator which operate at high frequency and efficiency.

It is generally known that the corona power capacity of a corona generator is dependent in part on the frequency of the power supplies across the plates thereof. Traditionally, high voltage power is supplied to a corona generator at the frequency of the primary source that is, the line frequency. To increase the frequency of power applied to corona generators, it has been suggested that mechanically driven (motor generator) frequency converters be used. It also has been suggested that electronic circuits which include vacuum tubes or solid state devices may also be used to increase frequency.

It has generally been found that motor generator frequency converters are expensive, inefficient, and not particulary durable. Furthermore, frequency converters which utilize vacuum tubes or solid state circuits are often restricted with respect to efficiency.

Accordingly, it is an object of the present invention to provide an improved corona generator device which operates at high frequency and efficiency.

It is a further object to provide improved high frequency power supply circuits which are particularly suited for operation with corona generators.

It is another object to provide a means by which the voltage and frequency at which SCR's may be reliably operated may be increased.

It is still a further object to provide inexpensive high frequency mono and bipolar power supplies for corona generators which are constructed from durable, readily available solid state components.

These objects and others will become readily apparent to one skilled in the art from the following detailed description and drawings wherein:

FIG. 5 is a graphic representation of data obtained from a typical prior art circuit wherein voltage is plotted on the vertical axis and time on the longitudinal axis;

FIG. 6 shows comparison data obtained from the circuit of the present invention (dotted line);

Broadly, I have found that the circuit turn-off time of SCR's used as high power, high frequency electrical switches in a power supply may be reliably increased by driving two or more unmatched SCR's in series.

More specifically, a preferred embodiment of my invention involves a corona generator and associated high voltage power supply which includes a plurality of unmatched silicon controlled rectifiers (hereinafter referred to as SCR's) which are electrically connected in series with a source of DC potential and the low voltage winding of a high voltage transformer, the high voltage winding of which is connected to the plates of a corona generator.

Figure 1:
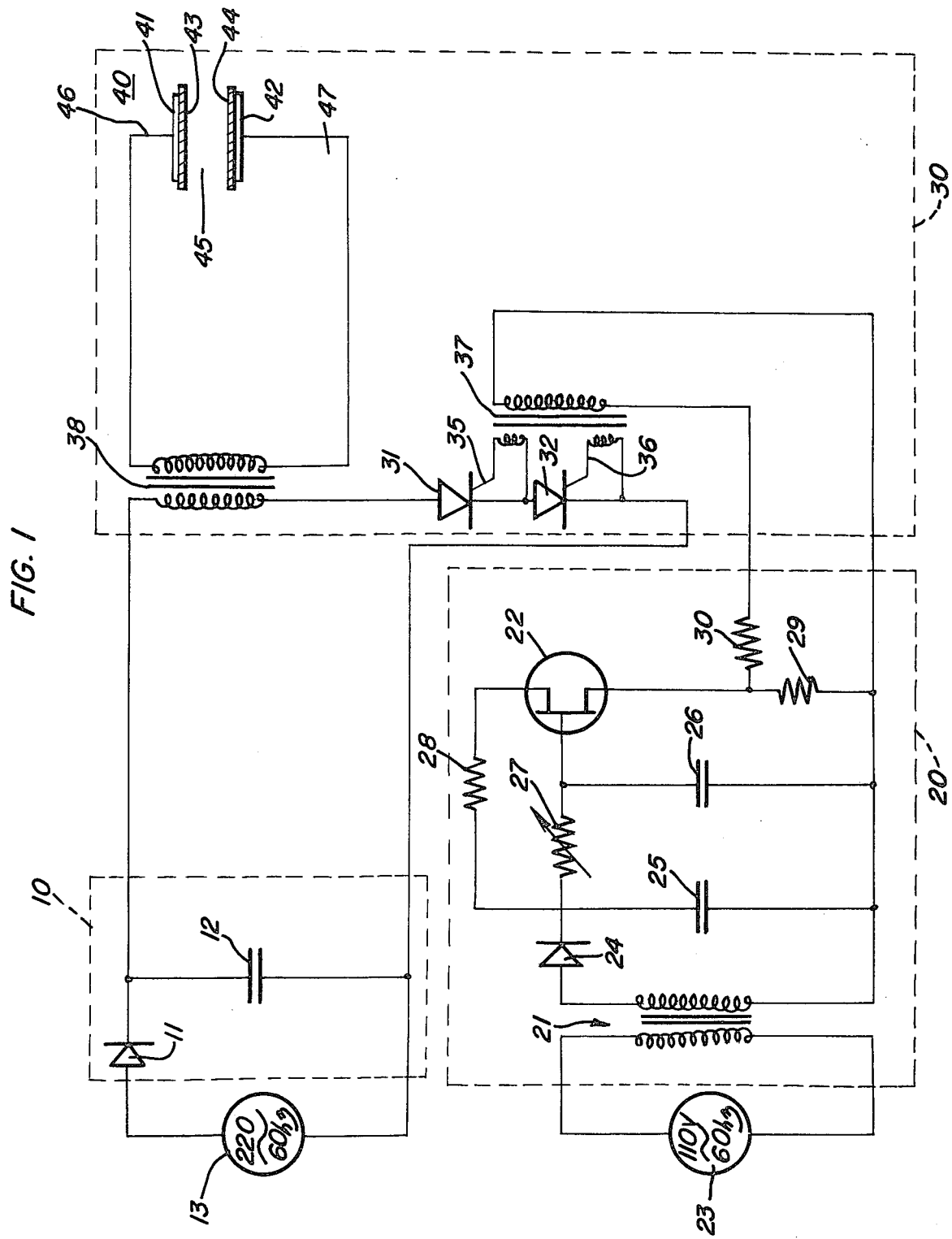
FIG. 1 is a diagram of a circuit of the present invention used to supply high voltage, high frequency power to a corona generator.

A more clearly detailed understandng of my invention may be obtained by reference to FIG. 1 of the drawing wherein the circuit generally outlined by broken line 10 is a conventional rectifier circuit which supplies pulsed DC voltage. Rectifier circuit 10 includes a rectifier diode 11 interconnected with capacitor 12 and a source of 60 cycle 220 volt AC current indicated as 13. While the drawing shows the use of a single rectifier circuit suitable for operation in single phase current, it is contemplated that multi-phase bridge type rectifier circuits are particularly suited for commercial application of the invention.

Also shown in FIG. 1 is a conventional pulse generator circuit, the components of which are included within the confines of broken line generally 20. The pulse generator circuit includes a transformer 21 and a unijunction transistor 22. One winding of the transformer 21 is connected in series with a source of 60 cycle 110 volt AC potential shown as 23. The other winding of the transformer 21 is connected to diode 24, and to a common collector conductor for several other circuit components including one side of capacitors 55 and 26. Also included in pulse generator circuit 20 is a variable resistor 27 and a fixed resistor 28. The variable resistor 27 and the fixed resistor 28 are also connected to the unijunction transistor 22. One lead from the unijunction transistor 22 interconnects with fixed resistances 29 and 30. It is to be understood that a wide variety of commercially available pulse generators of low power are suitable for use in the present invention.

FIG. 1 also includes an inverter circuit generally outlined by broken line 30. The inverter circuit 30 includes two SCR's 31 and 32 connected in series. The SCR 31 has a gate lead 35 and the SCR 32 has a gate lead 36. Also included in the inverter circuit is a transformer 37 which possesses two secondary windings which are interconnected with the gates 35 and 36 of the series connected SCR's 31 and 32.

The inverter circuit 30 includes a high voltage transformer 38 and a corona generator generally 40. The corona generator 40 is schematically shown and includes an upper electrode 41 and a lower electrode 42. The upper electrode 41 has a dielectric layer 43 and the lower electrode 42 has a dielectric layer 44. Between the elecrodes 41 and 42, a corona gap 45 is defined.

The corona generator generally 40 is connected to the high voltage side of transformer 38 by means of conductors 46 and 47.

Figure 2:
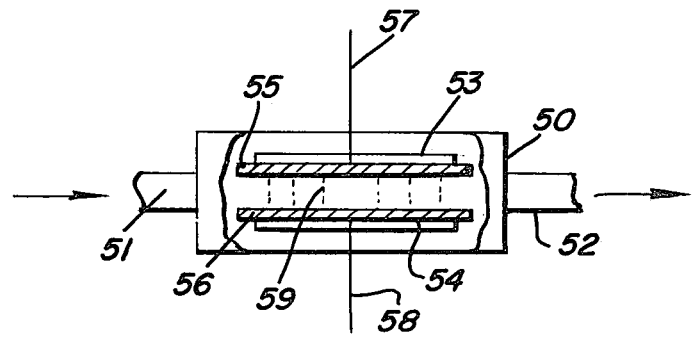
FIGS. 2, 3 and 4 show various configurations of conventional corona generators (with parts broken away) which may be used in conjunction with power supply circuits of the present invention.
Figure 3:
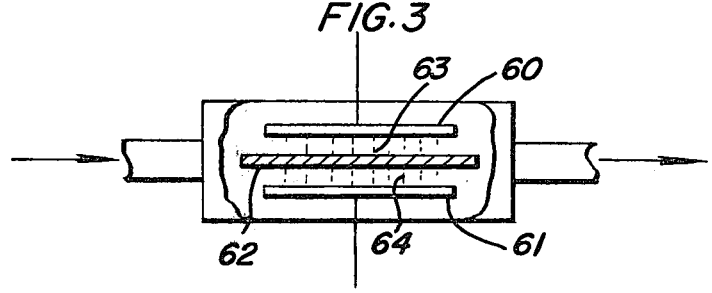
Figure 4:
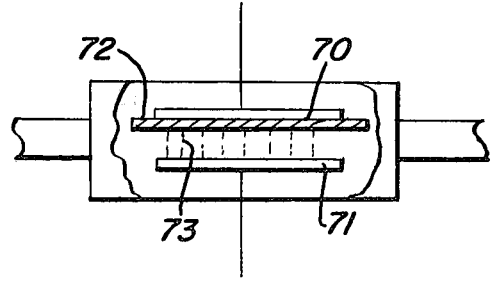

FIGS. 2, 3 and 4 of the drawing disclose in greater detail a variety of typical configurations of corona generators which may be utilized in the circuit generally shown in FIG. 1. The corona generator 40, as shown in FIG. 1, may comprise the structure shown in FIG. 2 wherein a reaction chamber 50 is equipped with a gas conduit inlet 51 and a gas conduit outlet 52. Within the container 50, an upper electrode 53 is mounted along with lower electrode 54. Electrodes 53 and 54 are provided with a dielectric layer 55 and 56 respectively. The electrodes 53 and 54 are connected with conductors 57 and 58 which in turn are connected with a source of high voltage, high frequency potential such as is produced in the circuit shown in FIG. 1. Between the electrodes 53 and 54 a corona gap 59 is defined.

In FIG. 3 an alternative corona generator structure is shown wherein electrodes 60 and 61 are separated by a single dielectric plate 62. The corona generator of FIG. 3 possesses two corona gaps, 63 and 64.

FIG. 4 shows still another suitable corona generator configuration for use in the present invention wherein electrode plates 70 and 71 are separated by means of a single dielectric plate 72 which is affixed to the uppermost electrode plate 70. The corona generator configuration of FIG. 4 possesses a single corona gap 73.

While FIGS. 2, 3 and 4 show typical plate type corona generators, it is to be understood that other well known corona generator configurations such as the well known tube type generator may be used.

In operation of the circuit shown in FIG. 1, it is seen that the rectifier/capacitor combination 10 produces a steady DC potential at typically 318 volts ($\sqrt{2} \times 220$ volts). This potential from the rectifier circuit 10 is supplied to the inverter circuit 30 through one side of the high voltage transformer 38, which is connected in series to the power supply circuit 10 through the series connected SCR's 31 and 32. The pulse generator circuit 20 is adjusted to produce the desired frequency of triggering pulses which range from about ⅓ to 20,000 cycles per second. The trigger pulses from the pulse circuit 20 are fed through pulse transformer 37, the output of which appears in the two secondary windings thereof at the gates 35 and 36 of the SCR's 31 and 32. As is generally known in the art, the trigger pulses from the pulse circuit 20 will cause the SCR's to conduct (fire). Upon firing a current is passed through one side (low voltage winding) of the high voltage transformer 38. At the high voltage winding of the transformer 38 a high voltage power pulse appears which will have a voltage from about 2.0 to 20.0 KV. The high voltage pulse from the transformer 38 then appears between plates 41 and 42 of the corona generator 40. This high voltage pulse creates a corona within the corona gap 45. A gas which is contained within the gap 45 is subjected to the high voltage corona, and in the case wherein the gas is or includes oxygen, ozone is produced.

Once the SCR's 31 and 32 are in a conducting mode, it is seen that they must be switched to a non-conducting mode in order to produce the high frequency pulses of current through the high voltage transformer 38. In the operation of the present circuit the SCR's connected in series 31 and 32 are switched to a non-conducting mode as follows:

When the above described power pulse is applied to the corona cell 40, the high voltage burst produces an electrical discharge at the instant the voltage exceeds the gas sparking potential in gap 45. The electrons produced are attracted towards the positive electrode. This electron flow constitutes the major current flow giving rise to the corona power dissipation at that particular voltage. The electrons cannot pass the dielectric barrier and hence accumulate on the dielectric as in a capacitor. Hence, the current flow ceases. Further corona action stops until another power pulse is applied. The abrupt current stoppage induces a reverse voltage pulse in the secondary of transformer 38 by Lenz's Law. This reverse voltage pulse is transformed to the primary and hence supplies the reverse voltage needed to turn-off (commutate) the SCR's 31 and 32.

The benefit of the two series SCR's shown in FIG. 1 will now be explained. First, the present application taxes the capabilities of any SCR when large average powers are called for. Large here means about 40,000 watts average corresponding to 300 pounds per day of ozone. The limiting SCR parameters are turn-off time and frequency at the peak currents required. FIG. 5 shows the typical SCR voltage history for a circuit in which a single SCR is used. The first firing is at $T_1$, the SCR voltage drops (switches) from Vmax to a much lower value Vmin. The SCR conducts from $T_1$ to $T_2$ (typically 100 microseconds). At $T_2$ to $T_3$ the reverse, that is, commutating or turn-off pulse appears. At $T_3$ the reverse pulse net effect is zero and the SCR voltage climbs back to Vmax at $T_4$ ready for the next firing. Most available SCR's require at least 10–15 microseconds turn-off time at the high power levels of interest, that is, $T_2$ to $T_3$ must be at least 10–15 microseconds. If, for example, the voltage goes positive at $T_3$ less than 10–15 microseconds after $T_2$, then the SCR will not turn-off, and will immediately either destroy itself or blow any protective fuses present.

FIG. 6 shows the benefit of reducing the SCR voltage by using the series connected SCR's of the present invention. In the circuit of FIG. 1, the duration of the actual reverse pulse or turn-off time is increased by the increment shown as $T_3$ to $T_3'$ in FIG. 6. Hence if two SCR's are in electrical series, the maximum voltage across each SCR is decreased as shown by the dashed curve in FIG. 6, and correspondingly the reverse pulse or turn-off time is increased by the increased increment of time $T_3$ to $T_3'$ which is gained by the lessening of the slope of the voltage curve between $T_2$ to $T_3'$ to $T_4$. If the SCR's are perfectly matched in terms of the forward voltage drop characteristic (as generally shown in the prior art), the increment $T_3$ to $T_3'$ is increased by 30 to 50 percent. If the SCR's are unequal with respect to forward voltage drop characteristics, the $T_3$ to $T_3'$ for the SCR conveying the higher voltage may be improved only slightly, but for the SCR conveying the reduced voltage, the increase in $T_3$ to $T_3'$ is considerably increased. In view of the fact that both SCR's must "latch-up" (fail to turn off) before damage occurs since they are in series, the turn-off time of the pair is that of the SCR which handles the lesser voltage. Any selection of unmatched SCR's for series application is in opposition to the normal use of series SCR's. As clearly recognized in the prior art SCR's, as any rectifier, are limited in reverse voltage capability, for example, 1000 volts. If 3000 volt service is required, then three series units will work if they are perfectly matched. If not balanced, the weakest one (for example, 900 volts) will break down, and the rest will follow like a line of dominoes.

While the present discussion relating to the operation of a plurality of series connected SCR's is generally directed to the use of two SCR's in series, it is to be understood that three or more SCR's in series, and in certain high voltage applications as many as hundreds or thousands of series connected SCR's, may be advantageously used.

In essence, my preferred unbalanced series SCR arrangement allows higher frequency operation with a greater margin of safety than with a single SCR or series connected SCR's which are selected to carry equal voltages. This unobvious result is obtained due to the fact the reverse pulse, that is, turn-off time, for a pair (or more) of SCR's is that of the SCR carrying the least voltage. This permits the pair of SCR's to be driven at frequencies where the reverse pulse or turn-off time approaches the theoretical minimum for the SCR carrying the greatest voltage.

For example, a SCR which is carrying 800 amps (peak) at 310 volts normally requires a minimum turn-off time ($T_2-T_3$) of 20 microseconds to operate with a reasonable degree of safety. However, if the single SCR is replaced with a pair of SCR's wherein one SCR carries one-quarter the voltage of the other, that is, 60 and 250 volts respectively, turn-off time ($T_2-T_3'$ in FIG. 6) is increased by $T_3-T_3'$ for each SCR. For the SCR which carries the lesser voltage the increased turn-off time is about 35 microseconds, and 15 microseconds for the higher voltage SCR. Since SCR's can operate safely at 10 to 15 microseconds turn-off, the overall cycling period ($T_1$ to $T_4$) may be decreased by about 100 percent, which is equivalent to increasing the operational frequency by an equal amount.

The term forward "voltage drop characteristic" as applied to SCR's used herein is also sometimes referred to as the "maximum forward blocking voltage" for an SCR and is that voltage drop applied across an SCR for which no significant current will flow. If this maximum applied forward voltage is exceeded, then the SCR is liable to fire, that is, conduct, just as if a firing pulse was applied to the gate. It is recognized that some circuits use this method to fire SCR's in preference to gate firing.

Figure 7:
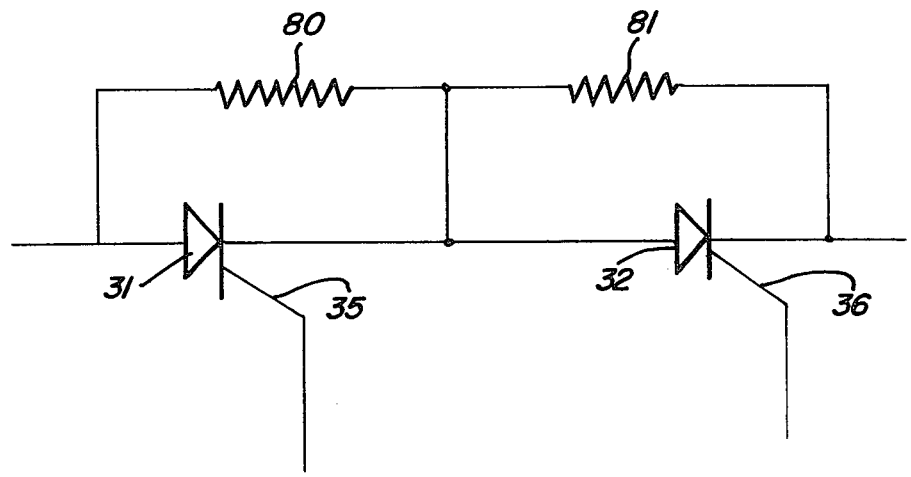
FIGS. 7 and 8 show preferred voltage unequalization networks which may be used in the circuit of FIGS. 1, 9 and 10.

The unbalanced forward voltage drop characteristic of the multiple SCR's may be an inherent electrical characteristic of the SCR's which is produced by manufacturing techniques. The unbalance may also be produced by placing unbalanced shunt connected resistance elements with the SCR's. Such an arrangement is shown in FIG. 7 which shows the series connected SCR's 31 and 32 of FIG. 1 to which have been added unequalizing network shunt resistors 80 and 81. The resistors 80 and 81 preferably have a difference in value of at least about ±10%. Therefore, if resistor 80 has a value of 5 ohms, resistor 81 will have a value of about 4.5 or 5.5 ohms.

Figure 8:
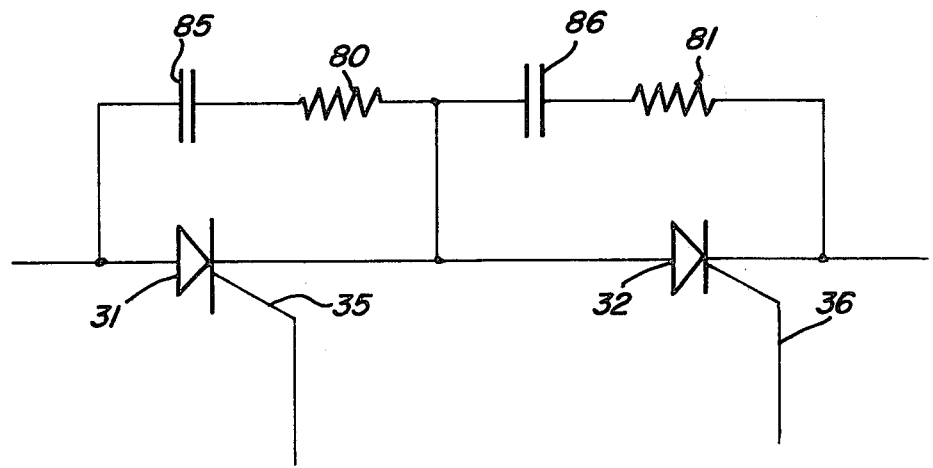

In FIG. 8 a more preferred unequalizing network is shown which includes capacitors 85 and 86 as well as the unequal resistors 80 and 81 of FIG. 7. Capacitos 85 and 86 serve to protect the SCR's 31 and 32 from unwanted high voltage transients, and accordingly serve the well known "snubber" function. The value of the capacitors 85 and 86 is on the order of 0.2 microfarad ±10%.

The circuit set forth in FIG. 1 is constructed of conventional components which are readily available from commercial sources. In one preferred embodiment of the present invention the circuit component shown in FIG. 1 may fall within the definitions set forth in the tables below.

TABLE I

Rectifier Circuit 10

| Reference No. | Component | Rated Value |
|---|---|---|
| 11 | Rectifier diode | 1000 volt - 1000 amp |
| 12 | Capacitor | 10-300 microfarad |
| 13 | Power Supple | 220 volts AC |

TABLE II

Pulse Generator Circuit 20

| Reference No. | Component | Rated Value |
|---|---|---|
| 21 | Transformer | 1 amp 25 volt |
| 22 | Unijunction transistor | U2T |
| 23 | Power supply | 110 volt AC |
| 24 | Diode | 1 amp - 100 volt |
| 25 | Capacitor | 2000 microfarad - 50 volt |
| 26 | Capacitor | 0.2 microfarad - 50 volt |
| 27 | Variable Resistor | 10,000 ohms - 1 watt |
| 28 | Resistor | ¼ watt |
| 29 | Resistor | ¼ watt |
| 30 | Resistor | ¼ watt |

TABLE III

Invertor Circuit 30

| Reference No. | Component | Rated Value |
|---|---|---|
| 31 & 32 | SCR | GE type 394 - 1000 amps peak at 2000 Hart 3, 600 volts 10 to 15 m.sec. turn-off. Or GE type 609 3000 amps peak at 2000 Hertz 3, 1200 volts 35 m.sec. turn-off |
| 37 | Pulse Transformer | Pulse Engineering Type 5258 |
| 38 | Transformer | Ratio of windings 9 to 1 |

As shown in FIG. 1, the present circuit includes a corona generator which is generally shown to be of the opposed plate type. Preferred generators are described in my U.S. Pat. No. 3,798,457. As shown in that patent, the corona generators contain electrode plates which are preferably coated with porcelain enamel dielectrics, having a thickness on the order of from about 0.10 to 0.5 millimeters. The corona gap defined by the opposed plates is preferably on the order of 0.75 to 2.0 millimeters. These corona generators preferably operate at high voltages on the order of 2.0 to 30.0 KV at a frequency ranging from about ⅓ to 20,000 Hz.

In one preferred operation of a corona generator, oxygen or an oxygen containing gas such as air is converted to ozone. It is found that the capacity of a given corona generator to produce ozone from oxygen is to some extent dependent upon the frequency of the power impressed across the electrode plates thereof. In the practice of the present invention the frequency which is produced by the power supply set forth in FIG. 1 may range from about 2000 to 3000 Hz. Compared to prior art power supplies which normally produce a frequency on the order of 50 to 60 Hz it is seen the power supply of the present invention is capable of producing a superior result in terms of enhancing the capacity and efficiency of a corona generator.

While the above description and specific example disclose the use of the present high voltage, high frequency power supply in conjunction with a corona generator, the present circuit may be used to provide power for devices which have similar load characteristics. Thus, in FIG. 1 the corona generator 40 may be replaced by a plasma generating or laser powering device.

The corona generator circuit of FIG. 1 provides a nonpolar output across the plates of the generator. In many instances it is desirable to provide a symmetrical bipolar output. Circuits which are capable of providing a bipolar form of power are set forth in FIGS. 9 and 10.

Figure 9:
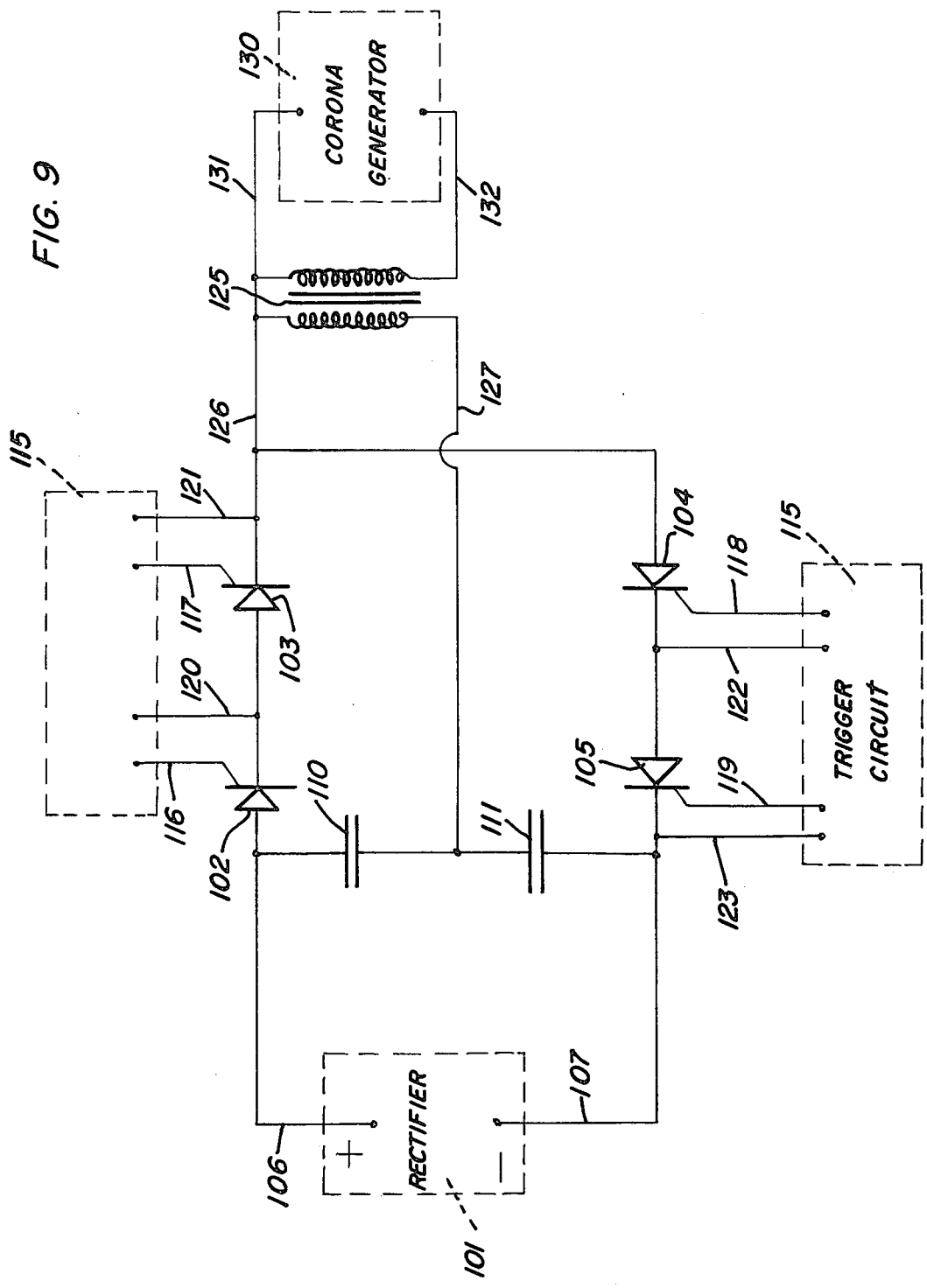
FIGS. 9 and 10 are diagrams of bipolar power supplies of the present invention.

FIG. 9 discloses a symmetrical, high frequency converter which includes alternately triggered SCR's, in series with a DC power supply, and individually in series with the primary winding of a transformer which is coupled to a corona discharge type load. The converter circuit of FIG. 9 includes capacitive voltage division means, which causes the alternately fired SCR's to conduct through the transformer in opposite directions, and thereby produce bipolar symmetrical power pulses to the corona discharge load.

Figure 11:
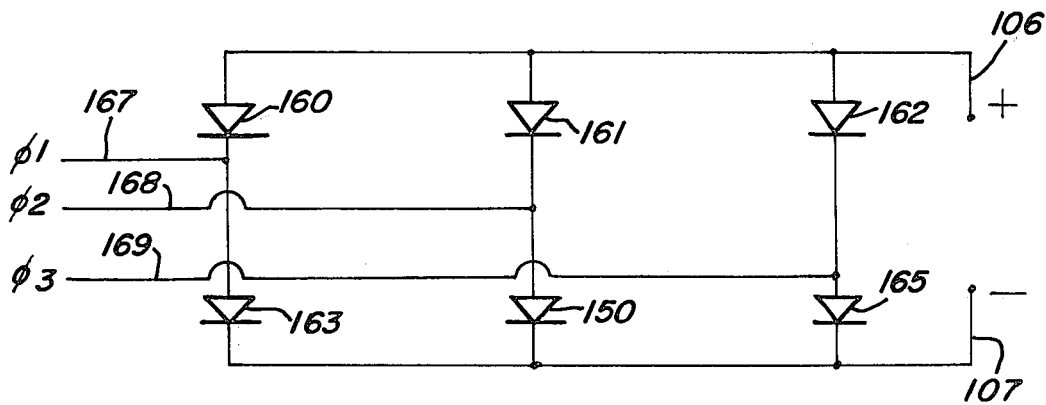
FIG. 11 is a diagram of a conventional rectifier circuit which may be used in conjunction with the circuits of FIGS. 9 and 10.

In FIG. 9, 101 indicates a broken line which surrounds a rectifier circuit, the details of which are set forth in FIG. 11. The circuit in FIG. 9 also includes SCR devices 102, 103, 104 and 105, which are connected in series with each other and also in series with the rectifier circuit 101 by means of electrical conductors 106 and 107. Also connected in series with the rectifier load by connection to the conductors 106 and 107 are voltage divider capacitors 110 and 111.

The SCR's 102, 103, 104 and 105 are triggered in pairs by means of a conventional source of pulsed voltage produced by a trigger circuit which is schematically shown as being enclosed within the confines of broken line 115. The details of the trigger circuit enclosed within broken line 115 are set forth in FIG. 12 of the drawing.

The trigger circuit 115 is interconnected to the SCR's 102, 103, 104 and 105 through the respective SCR gate leads 116, 117, 118 and 119. In addition, the trigger circuit outputs are delivered to each individual SCR by means of conductors 120, 121, 122 and 123.

The primary winding of a high voltage power transformer 125 is interconnected to the SCR circuit by means of conductors 126 and 127. The conductor 126 connects the primary winding of the power transformer 125 in series with each of SCR pairs 102 and 103, and 104 and 105 respectively. The conductor 127 interconnects the primary winding with capacitors 110 and 111.

In FIG. 9, broken line 130 outlines a corona generator type load which is connected with the secondary winding of power transformer 125 through conductors 131 and 132. Typical corona generator type loads 130 which may be utilized in FIG. 9 are set forth in detail in FIGS. 2, 3 and 4.

Figure 12:
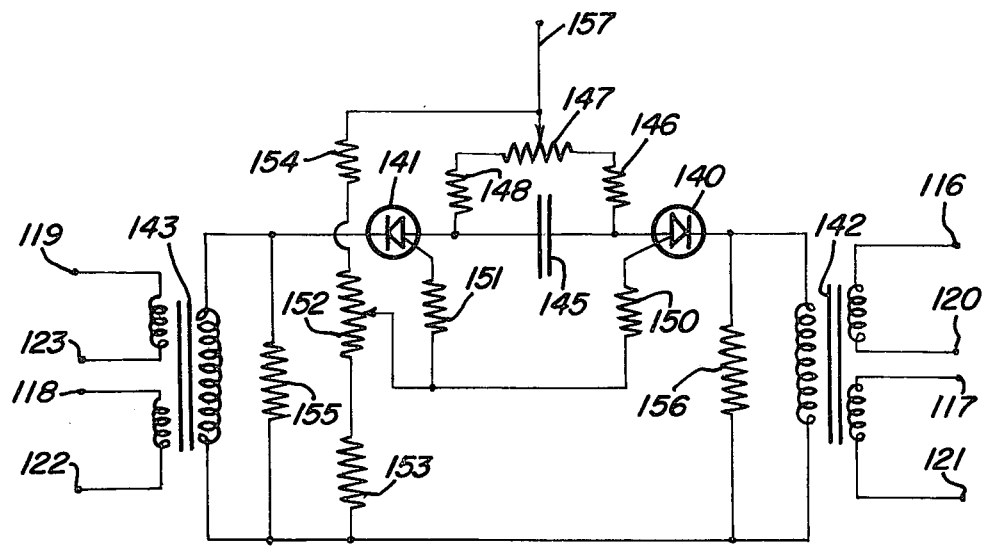
FIG. 12 is a diagram of a pulse generator circuit used to trigger the SCR's shown in circuits of FIGS. 9 and 10.

Reference to FIG. 12 reveals a typical programmable unijunction transistor (PUT) flip-flop trigger circuit which may be used to trigger the SCR's shown in FIG. 9. In FIG. 9 a circuit such as shown in FIG. 12 is enclosed within the broken line 115.

In FIG. 12 the flip-flop circuit comprises two unijunction transistors, 140 and 141, which are connected in series with the primary side of pulse isolation transformers 142 and 143 respectively. The circuit of FIG. 12 also includes a capacitor 145 connected in series between the transistors 140 and 141. The capacitor 145 is bridged by means of parallel connected resistances 146, 147 and 148. The resistances 146 and 148 are fixed, while the resistance 147 is a variable resistance which is used to trim the symmetry of the trigger pulse output of the flip-flop circuit.

Also included in FIG. 12 are fixed resistances 150 and 151 which are connected to the gates of transistors 140 and 141 respectively. A variable resistance 152 connects the gates of the transistors 140 and 141 to the circuit, which also includes fixed resistors 153 and 154 connected in series therewith. A pair of fixed resistances, 155 and 156, are connected between the outputs of the transistors 141 and 140 respectively, and also in series with the primary windings of isolation pulse transformers 142 and 143. A lead 157 connects the circuit of FIG. 12 with a suitable source of DC power which is typically maintained at 20 volts.

The trigger circuit of FIG. 12 is interconnected to the gates of the SCR's shown in FIG. 9 through conductors pairs 116 and 120, 117 and 121, 119 and 123, and 118 and 122, each pair being connected to individual secondary windings of pulse transformers 142 and 143. It is noted that the pulse transformer 142 and 143 each power a separate pair of SCR's; specifically transformer 142 delivers pulses to SCR's 102 and 103, while the isolation transformer 143 delivers pulses to SCR's 104 and 105.

FIG. 11 of the drawing represents a typical three-phase rectifier circuit, which may be used to supply DC power to the circuit shown in FIG. 9. A rectifier circuit which may be enclosed within broken line 101 of FIG. 9 is set forth in some detail in FIG. 11, and includes diodes 160, 161, 162, 163, 164 and 165. As shown in FIG. 11, the diodes are connected to a source of three-phase power, which is introduced to the circuit by means of conductors 167, 168 and 169. The output of the rectifier circuit in FIG. 11 appears across leads 106 and 107, which are connected in series with the SCR's shown in FIG. 9.

The circuit of FIG. 9 is used to supply high frequency, symmetrical AC power to a corona generator type load, which is indicated in FIG. 9 as being enclosed within broken line 130. A corona generator type load may typically comprise a corona generator or may comprise a load which comprises capacitance and resistance characteristics similar to that exhibited by a corona generator. The corona generator load represented by broken line 130 may typically comprise a corona generator device which is set forth in FIGS. 2, 3 and 4 of the drawing.

The unequalization networks of FIGS. 7 and 8 may be advantageously used in conjunctions with the pairs of SCR's 102 and 103, and 104 and 105 shown in FIG. 9.

In operation, the circuit of FIG. 9 is supplied with rectified electrical power by means of the rectifier circuit 101 at a voltage on the order of about 150 to 600 volts DC. This DC power appears across SCR pair 102 and 103; SCR pair 102 and 103 is connected to the trigger circuit 115 by means of leads 116 and 120, and 117 and 121. The trigger circuit 115 delivers an electrical pulse of about 20 volts, whereupon the SCR's 102 and 103 conduct. The power conducted by SCR's 102 and 103 appears across the primary of power transformer 125, and thence to capacitances 110 and 111. When the power pulse appears across the primary of transformer 125, a transformed pulse appears across the secondary of the power transformer 125 at a voltage which is multiplied in accordance with the winding ratios of the power transformer 125. Preferably, this winding ratio will be on the order of from about 8:1 to 30:1. The transformed power pulse then is applied to the plates of a corona generator type load, shown as 130, and which may comprise the devices shown in FIGS. 104, 105 and 106. The electrical pulse serves to ionize the gas appearing between the plates of the corona generator, whereupon the pulse is conducted. As the pulse is conducted across the gap of the corona generator, the voltage drop across the gap is clamped at a fixed value due to the conductivity of the ionized gas existing between the plates. The conduction across the plates abruptly ceases since the electrons cannot go through the dielectric. The abrupt stoppage of current creates an opposite voltage pulse to appear through the secondary winding of transformer 125, which is then transformed through the primary winding and thence to the SCR's 102 and 103. This reverse pulse serves to shut off, that is, commutate, the SCR's 102 and 103 to a non-conductive or blocking mode.

Subsequent to firing SCR's 102 and 103, the trigger circuit 115 then delivers an alternate trigger pulse to SCR pair 104 and 105. SCR's 104 and 105 then conduct a power pulse through the secondary of power transformer 125 in a direction opposite to the pulse previously transmitted by SCR's 102 and 103. This power pulse appears across the plates of corona generator 130 with a polarity opposite to that of the previously delivered pulse. Thus, it is seen that by alternately firing SCR pair 102 and 103, and then SCR pair 104 and 105, the power pulses appearing across the corona generator plates are symmetrical, and each plate is therefore alternately charged to opposite polarity. In operation of the apparatus it is of significant importance that the output of the trigger circuit 115 and power transformer 125 be maintained as symmetrical as possible to minimize electro-mechanical vibrations in the power transformer 125. When the current is tuned to produce a string of positive pulses within about 0.1 microsecond of being with the center of the negative string, the vibrations cancel and noise level is at a minimum.

The flip-flip trigger circuit which is shown in FIG. 12, as well as the rectifier circuit shown in FIG. 11, is conventional, and operate in the conventional manner. The trigger circuit shown in FIG. 12 is preferably operated at a frequency of from about 100 to 10,000 Hz. The output of the SCR circuit of FIG. 9 is preferably transformed by power transformer 125 so as to produce an output voltage to the corona generator load on the order of from about 4,000 to 15,000 volts peak.

To further indicate the construction of the circuits of FIGS. 9, 11 and 12, the following table is given to indicate typical values of the various circuit elements set forth therein.

TABLE

| Figure | Component & Ref. No. | Volume and/or Mfg. Description |
|---|---|---|
| | SCR 1, 2, 3 & 4 | GE types C392, C393, C394, C395 or C609 |
| | Capacitor 10 & 11 | Oil Filled 10 to 100 mf |
| | Transformer 25 | Secondary/Primary Ratio 10/1; 125 KVA |
| | Transistor 40 & 41 | 2N6027 or 2N6028 |
| | Transformer 42 & 43 | Pulse Engineerig, Inc. Type 5258 |
| | Capacitor 45 | 0.01 mf |
| | Resistor 46 | 10 K ohms |
| | Variable Resistor 47 | 50 K ohms |
| | Resistor 48 | 10 K ohms |
| | Resistor 50 & 51 | 100 K ohms |
| | Variable Resistor 52 | 1 K ohm |
| | Resistor 53 & 54 | 100 ohms |

TABLE-continued

| | |
|---|---|
| Resistor 55 & 56 | 470 ohms |
| Diode 60, 61, 62, 63, 64 & 65 | A90-11-S-F1A1 1000 v 4500 surge amps. |

Figure 10:
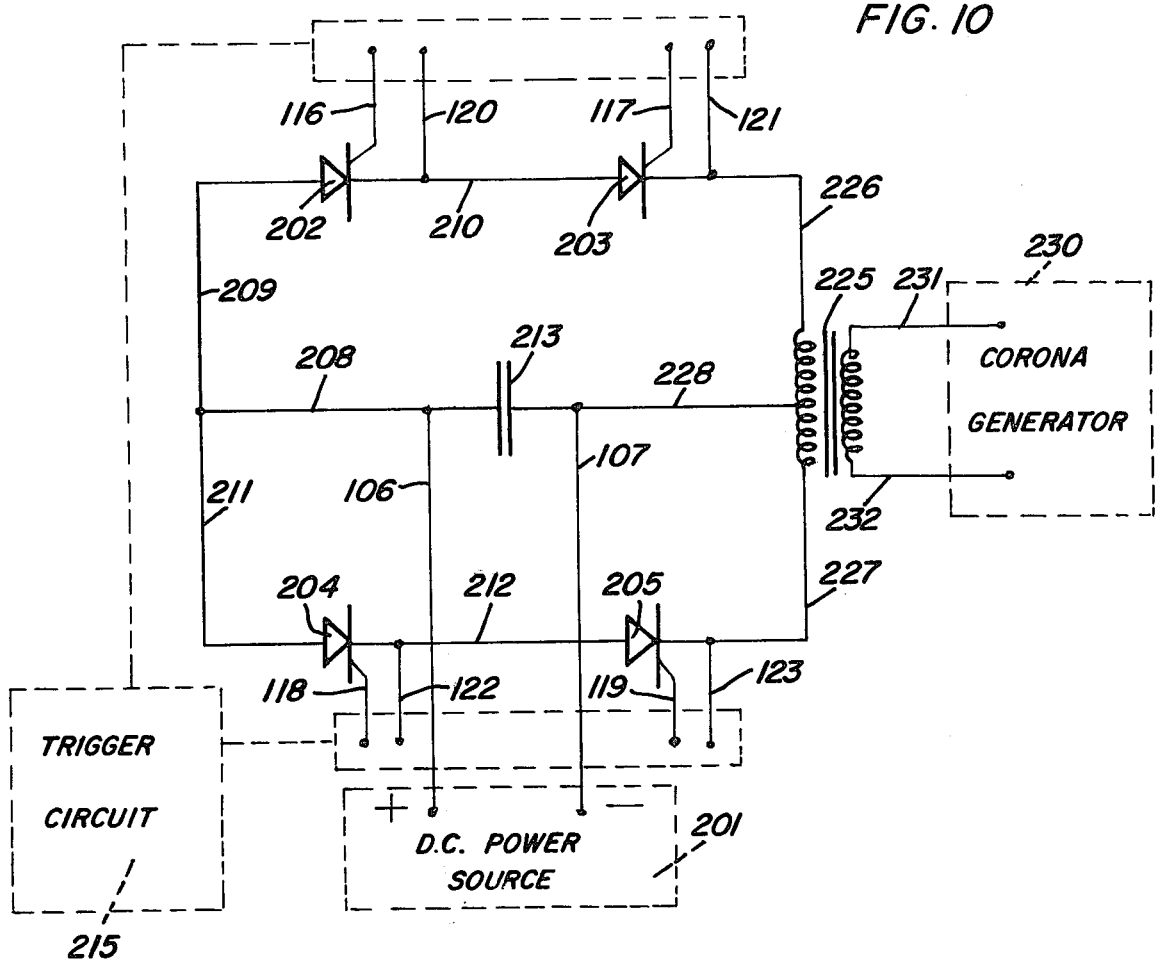

Another preferred symmetrical high frequency converter circuit is shown in FIG. 10, which includes alternately triggered SCR's, in series with a DC power supply, and individually in series with the center tap of a primary winding of a transformer, the secondary of which is coupled to a corona discharge type load. The alternately fired SCR's conduct through the transformer in opposite directions, and thereby produce bipolar symmetrical power pulses to the corona discharge load.

In FIG. 10, 201 indicates a broken line which surrounds a rectifier circuit, the details of which are set forth in FIG. 11. The circuit in FIG. 10 also includes SCR devices 202, 203, 204 and 205, which are connected in series with each other and also in series with the rectifier circuit 11 by means of electrical conductors 106, 107, 208, 209, 210, 211 and 212. Capacitor 213 is connected across the output of the rectifier circuit 201 to minimize fluctuations in its output.

The SCR's 202, 203, 204 and 205 are triggered in pairs by means of a conventional source of pulsed voltage produced by a trigger circuit which is schematically shown as being enclosed within the confines of broken line 215. The details of the trigger circuit enclosed within broken line 215 are set forth in FIG. 12 of the drawing.

The trigger circuit 215 is interconnected to the SCR's 202, 203, 204 and 205 through the respective SCR gate leads 116, 117, 118 and 119. In addition, the trigger circuit outputs are delivered to each individual SCR by means of conductors 120, 121, 122 and 123.

The primary winding of a center-tapped high voltage power transformer 225 is interconnected to the circuit by means of conductors 226 and 228. The conductors 226 and 228 connect one half of the primary winding of the power transformer 225 in series with SCR 202 and 203, while conductors 227 and 228 connect the other half of the primary winding with SCR 204 and 205.

In FIG. 10, broken line 230 outlines a corona generator type load which is connected with the secondary winding of power transformer 225 through conductors 231 and 232. Typical corona generator type loads 230 which may be utilized in FIG. 1 are set forth in detail in FIGS. 2, 3 and 4.

The trigger circuit of FIG. 12 is interconnected to the gates of the SCR's shown in FIG. 10 through conductor pairs 116 and 120, 117 and 121, 119 and 123, and 118 and 122, each pair being connected to individual secondary windings of pulse transformers 142 and 143. It is noted that the pulse transformers 142 and 143 each power a separate pair of SCR's; specifically, transformer 142 delivers pulses to SCR's 202 and 203, while the isolation transformer 143 delivers pulses to SCR's 204 and 205.

FIG. 11 of the drawing represents a typical three-phase rectifier circuit, which may be used to supply DC power to the circuit shown in FIG. 10.

The FIGS. 7 and 8 show two configurations of unequalization networks which may also be advantageously used in conjunctions with the pairs of SCR's 202 and 203, and 204 and 205 shown in FIG. 10.

In operation, the circuit of FIG. 10 is supplied with rectified electrical power by means of the rectifier circuit 201 at a voltage on the order of about 150 to 600 volts DC. This DC power appears across SCR pair 202 and 203; SCR pair 202 and 203 is connected to the trigger circuit 215 by means of leads 116 and 120, and 117 and 121. The trigger circuit 215 delivers an electrical pulse of about 20 volts, whereupon the SCR's 202 and 203 conduct. The power conducted by SCR's 202 and 203 appears in a conventional clockwise direction across one half of the primary of power transformer 225. When the power pulse appears across the primary of transformer 225, a transformed pulse appears across the secondary of the power transformer 225 at a voltage which is multiplied in accordance with the winding ratios of the power transformer 225. Preferably, this winding ratio will be on the order of from about 8:1 to 30:1. The transformed power pulse then is applied to the plates of a corona generator type load, shown as 230, and which may comprise the devices shown in FIGS. 2, 3 and 4. The electrical pulse serves to ionize the gas appearing between the plates of the corona generator, whereupon the pulse is conducted. As the pulse is conducted across the gap of the corona generator, the voltage drop across the gap is clamped at a fixed value due to the conductivity of the ionized gas existing between the plates. The conduction across the plates abruptly ceases since the electrons cannot go through the dielectric. The abrupt stoppage of current creates an opposite voltage pulse to appear through the secondary winding of transformer 225, which is then transformed through the primary winding and thence to the SCR's 202 and 203. This reverse pulse serves to shut off, that is, commutate the SCR's 202 and 203 to a non-conductive or blocking mode.

Subsequent to firing SCR's 202 and 203, the trigger circuit 215 then delivers an alternate trigger pulse to SCR pair 204 and 205. SCR's 204 and 205 then conduct a power pulse through the other half of the primary of power transformer 225 in a direction opposite to the pulse previously transmitted by SCR's 202 and 203, that is, counter-clockwise as shown in FIG. 10. This power pulse appears across the secondary of transformer 225, and hence the plates of corona generator 230 with a polarity opposite to that of the previously delivered pulse. Thus, it is seen that by alternately firing SCR pair 202 and 203, and then SCR pair 204 and 205, the power pulses appearing across the corona generator plates are symmetrical, and each plate is therefore alternately charged to opposite polarity.

To further indicate the construction of the circuit of FIG. 10, the following table is given to indicate typical values of the various circuit elements set forth therein.

TABLE

| Figure | Component & Ref. No. | Volume and/or Mfg. Description |
|---|---|---|
| 10 | SCR 1, 2, 3 & 4 | GE types C392, C393, C394, C395 or C609 |
| | Capacitor 13 | Oil Filled 10 to 100 mf |
| | Transformer 25 | Secondary/Primary Ratio 10/1, 10KVA |

The above description clearly describes and sets forth improved solid-state frequency converter circuits which may be used to supply high frequency, high voltage power for a variety of purposes.

I claim:
1. A corona generator system for supplying at least 40,000 watts average power to a corona cell which comprises:
   a. a source of DC power;
   b. a transformer having a low voltage primary winding and a high voltage secondary winding with a turns ratio adapted to provide a high voltage power pulse across said secondary winding from a relatively low voltage impressed across said primary winding of between about 150 to 600 volts DC;
   c. at least two SCR's connected in a series circuit relationship with said source of DC power and said low voltage primary winding, each of said SCR's being unequal to each other with respect to their forward voltage drop characteristic;
   c'. means for pulsing the gates of said SCR's at a desired frequency;
   d. said corona cell having spaced electrodes with a surface area large enough to generate a corona discharge of at least said 40,000 watts of average power and for generating a reverse commutating voltage of sufficient duration for turning off at least one of said SCR's within each pulse period; said corona cell representing the only commutating means for said SCR's in said system.

2. The corona system as defined in claim 1 further comprising a forward voltage unequalization network connected across each SCR.

3. The corona system as defined in claim 2 wherein each of said unequalization networks comprise an impedance of unequal magnitude.

4. The corona system as defined in claim 3 wherein each of said unequalization networks comprise a combination of resistance and capacitance.

5. The corona system as defined in claim 2 wherein said source of DC power includes a first and second DC source respectively; and further comprising a first and second set of SCR's, with said first set including at least two SCR's in a series circuit relationship with said first DC source and said transformer low voltage primary winding; and said second set of SCR's including at least two SCR's in a series circuit relationship with said second DC source and said transformer low voltage primary winding.

6. The corona system as defined in claim 5 wherein a first capacitor is connected across said source of DC power for forming said first DC source and wherein a second capacitor is connected across said source of DC power in a series circuit relationship with said first capacitor, said second capacitor forming said second DC source.

7. The corona system as defined in claim 2 wherein said low voltage primary winding of said transformer includes a center tap, said system further comprising a first and second set of SCR's with said first set including at least two SCR's connected in a series circuit relationship with said source of DC power and with said primary winding of said transformer from one end thereof to said center tap; and said second set of SCR's including at least two SCR's connected in a series circuit relationship with said source of DC power and with said primary winding of said transformer from the other end thereof to said center tap.

* * * * *